US008001283B2

(12) United States Patent
Lee et al.

(10) Patent No.: US 8,001,283 B2
(45) Date of Patent: Aug. 16, 2011

(54) EFFICIENT, SCALABLE AND HIGH PERFORMANCE MECHANISM FOR HANDLING IO REQUESTS

(75) Inventors: William Lee, Portland, OR (US); Thomas Benjamin Berg, Portland, OR (US)

(73) Assignee: MIPS Technologies, Inc., Sunnyvale, CA (US)

( * ) Notice: Subject to any disclaimer, the term of this patent is extended or adjusted under 35 U.S.C. 154(b) by 542 days.

(21) Appl. No.: 12/047,257

(22) Filed: Mar. 12, 2008

(65) Prior Publication Data

US 2009/0234987 A1    Sep. 17, 2009

(51) Int. Cl.
*G06F 12/00* (2006.01)
*G06F 13/00* (2006.01)

(52) U.S. Cl. ............... 710/5; 710/6; 710/8; 710/464; 711/119; 711/141; 711/144; 711/146

(58) Field of Classification Search ............ 710/5, 8, 710/46; 711/119, 141, 144, 146
See application file for complete search history.

(56) References Cited

U.S. PATENT DOCUMENTS

| | | | | |
|---|---|---|---|---|
| 6,502,168 | B1 * | 12/2002 | Arimilli et al. | 711/119 |
| 6,721,813 | B2 * | 4/2004 | Owen et al. | 710/6 |
| 7,529,894 | B2 * | 5/2009 | Hetherington et al. | 711/141 |
| 2007/0073928 | A1 | 3/2007 | Bruno et al. | |
| 2007/0192545 | A1 | 8/2007 | Gara et al. | |
| 2007/0255906 | A1 | 11/2007 | Handgen et al. | |
| 2007/0266206 | A1 | 11/2007 | Kim et al. | |
| 2008/0010417 | A1 | 1/2008 | Zeffer et al. | |

OTHER PUBLICATIONS

Shasta: A low Overhead, Software-Only Approach for Supporting Fine-Grain Shared Memory; Scales et al.; Proc. of the $7^{th}$ Symp. on Architectural Support for Programming Languages and Operating Systems; 1996.*
Suh, Taeweon et al., "Supporting Cache Coherence in Heterogeneous Multiprocessor Systems," Proceedings of the Conference on Design, Automation and Test in Europe, 2004, 6 pages.*
Brown, J.A. et al., "Proximity-aware directory-based coherence for multi-core processor architectures," SPAA '07, Jun. 9-11, 2007, San Diego, California, USA., Copyright 2007 ACM 978-1-59593-667-7/ 07/0006, 9 pages, retrieved from the internet: <URL: http://cseweb. ucsd.edu/users/jbrown/papers/proximity-coher.pdf>.
Njoroge, N. et al., "ATLAS: A chip-multiprocessor with transactional memory support," Proceedings of the Conference on Design, Automation and Test in Europe 2007, Nice, France, Apr. 16-20, 2007, 6 pages, retrieved from the internet: <URL: http://tcc.stanford.edu/ publications/tcc_atlas_date2007.pdf>.

* cited by examiner

*Primary Examiner* — Tammara Peyton
(74) *Attorney, Agent, or Firm* — Kilpatrick Townsend & Stockton LLP; Ardeshir Tabibi (57) ABSTRACT

A system, apparatus and method for managing input/output requests in a multi-processor system is disclosed. An IO coherence unit includes an IO request handler, a variable size transaction table, and an IO response handler. The size of the transaction table varies according to the number of pending IO requests. The IO request handler stores information about pending IO requests in the transaction table to establish an order among related requests and to permit out-of-order handling of unrelated requests. The IO response handler tracks responses to the IO requests and updates the information in the transaction table. The IO coherence unit returns responses to requesting devices in compliance with device ordering requirements.

31 Claims, 8 Drawing Sheets

EFFICIENT, SCALABLE AND HIGH PERFORMANCE MECHANISM FOR HANDLING IO REQUESTS

BACKGROUND OF THE INVENTION

The present invention relates generally to multi-processor computer systems and, more particularly, to processing input/output requests in a multi-processor environment.

Modern multi-processor computing systems handle large numbers of input/output requests. These requests can come from a wide variety of sources and may affect data in use by one or more system processors.

Some requesting devices impose ordering requirements upon the requests they generate. Responses to such requests must be returned in the proper order or IO operations will fail. Tracking ordered requests can be resource intensive.

Demand for increased performance further complicates matters. Not only must a multi-processor system observe device ordering requirements, it must deliver high performance. Input/output requests must be processed quickly or backups will occur and performance will suffer.

Input/output requests must be handled efficiently so that processing hardware can scale to meet ever-changing demands. Hardware resources must be carefully utilized to avoid waste. Thus, there is a need in the art for improvements in the way that input/output transactions are handled in multi-processor computer systems.

BRIEF SUMMARY OF THE INVENTION

In accordance with one embodiment of the present invention, an input/output (IO) coherence unit for use in a multi-processor system is disclosed. The IO coherence unit includes, in part, an IO request handler, an IO response handler, and a variable size transaction table. The IO request handler receives pending IO requests from a plurality of IO devices and determines a next IO request for processing by the multiprocessor system. The transaction table stores information about the pending IO requests such that its size grows and shrinks according to the number of the pending IO requests. The IO request handler allocates and stores information for pending IO requests in the variable size transaction table to establish an order among requests having a same identifier. The IO response handler is configured to receive a response to a pending IO request and to update an entry in the transaction table corresponding to the response. The IO response handler also determines an order of responses in accordance with the information in the transaction table. The IO coherence unit returns the responses to the plurality of IO devices in the order determined by the IO response handler.

In one embodiment, the IO request handler converts a pending IO request that is a multi-cacheline read request into a plurality of single cacheline requests and allocates entries in the transaction table for each of the single cacheline requests. The IO request handler also allocates buffers to store read data units corresponding to each single cacheline read request for which an entry is allocated in the transaction table. The IO request handler converts a pending IO request that is a multi-cacheline write request into a plurality of single cacheline requests and allocates a single entry in the transaction table for the multi-cacheline request.

In one embodiment, the transaction table includes a first transaction table and a second transaction table. The IO request handler determines a request type for each pending IO request and stores read requests in the first transaction table and write requests in the second transaction table. Each pending IO request includes a thread identifier and the IO request handler searches the first and second transaction tables for the thread identifier of a received IO request and associates the received IO request with pending IO requests using the thread identifier. In some embodiments, the first and second transaction tables include linked lists of pending IO requests and the IO request handler associates the received IO request with the pending IO requests by adding it to the tail of a linked list corresponding to its thread identifier.

In one embodiment, the IO response handler detects that a pending IO request is completed when a predetermined number of responses corresponding to the pending IO request are received. The IO response handler returns a response to an IO device for a completed IO request when the completed IO request becomes the head of its respective linked list. The IO response handler updates the linked list of pending IO requests when a completed IO request becomes the head of the linked list and removes the entry for the completed IO request from the first or second transaction table.

In one embodiment, the pending IO requests include read requests and write requests. Each pending write request includes a number of acknowledgements and each pending read request includes a number of data units. The IO response handler updates the number of acknowledgments for a pending write request and the number of data units for a pending read request each time a response is received for the pending write request and the pending read request respectively.

In one embodiment, the IO coherence unit also includes an allocation manager which allocates an entry for a received IO request in the first transaction table if the received request is a read request and which allocates an entry in the second transaction table if the received request is a write request. If the allocation manager is unable to allocate an entry, the IO request handler stalls processing of the received IO request. In another embodiment, the IO coherence unit includes a first input port coupled to the IO request handler for receiving a serialized steam of read and write requests from the plurality of IO devices and a second input port for receiving data corresponding to write requests received at the first IO port. If the next IO request is a write request, the IO request handler determines if write data corresponding to the next IO request is received at the second port and suspends the next IO request if it is determined that the write data is not received.

DETAILED DESCRIPTION OF THE INVENTION

A system, apparatus and method for managing input/output requests in a multi-processor system is disclosed. An IO coherence unit includes an IO request handler, a variable size transaction table, and an IO response handler. The size of the transaction table varies according to the number of pending IO requests. The IO request handler stores information about pending IO requests in the transaction table to establish an order among related requests and to permit out-of-order handling of unrelated requests. The IO response handler tracks responses to the IO requests and updates the information in the transaction table. The IO coherence unit returns responses to requesting devices in compliance with device ordering requirements.

Figure 1:
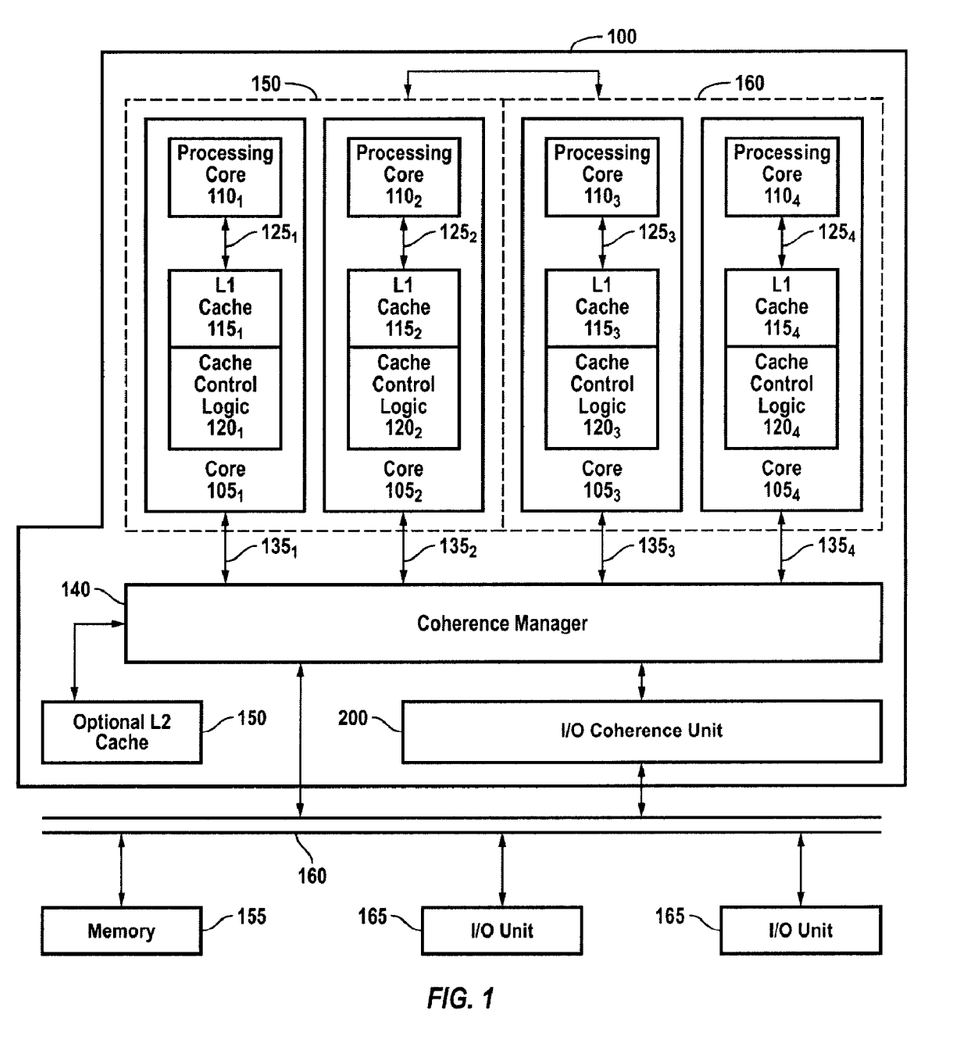
FIG. 1 depicts a multi-processor computer system according to one embodiment of the present invention.

FIG. 1 is a block diagram of a microprocessor 100, in accordance with one exemplary embodiment of the present invention, that is in communication with system memory 155 and IO units 165 via system bus 160. Microprocessor (hereinafter alternatively referred to as processor) 100 is shown as including, in part, four cores $105_1$, $105_2$, $105_3$ and $105_4$, a coherence manager 140, and an optional level-2 (L2) cache 150. Each core $105_i$, where i is an integer ranging from 1 to 4, is shown as including, in part, a processing core $110_i$, an L1 cache $115_i$, and a cache control logic $120_i$. Although the exemplary embodiment of processor 100 is shown as including four cores, it is understood that other embodiments of processor 100 may include more or fewer than four cores.

Each processing core $110_i$ is adapted to perform a multitude of fixed or flexible sequence of operations in response to program instructions. Each processing core $110_i$ may conform to either CISC and/or RISC architectures to process scalar or vector data types using SISD or SIMD instructions. Each processing core $110_i$ may include general purpose and specialized register files and execution units configured to perform logic, arithmetic, and any other type of data processing functions. The processing cores $110_1$, $110_2$, $110_3$ and $110_4$, which are collectively referred to as processing cores 110, may be configured to perform identical functions, or may alternatively be configured to perform different functions adapted to different applications. Processing cores 110 may be single-threaded or multi-threaded, i.e., capable of executing multiple sequences of program instructions in parallel.

Each core $105_i$ is shown as including a level-1 (L1) cache. In other embodiments, each core $110_i$ may include more levels of cache, e.g., level 2, level 3, etc. Each cache $115_i$ may include instructions and/or data. Each cache $115_i$ is typically organized to include a multitude of cache lines, with each line adapted to store a copy of the data corresponding with one or more virtual or physical memory addresses. Each cache line also stores additional information used to manage that cache line. Such additional information includes, for example, tag information used to identify the main memory address associated with the cache line, and cache coherency information used to synchronize the data in the cache line with other caches and/or with the main system memory. The cache tag may be formed from all or a portion of the memory address associated with the cache line.

Each L1 cache $115_i$ is coupled to its associated processing core $110_i$ via an interconnect $125_i$. Each interconnect $125_i$ includes a multitude of signal lines for carrying data and/or instructions. Each core $105_i$ is also shown as including a cache control logic $120_i$ to facilitate data transfer to and from its associated cache $115_i$. Each cache $115_i$ may be fully associative, set associative with two or more ways, or direct mapped. For clarity, each cache $115_i$ is shown as a single cache memory for storing data and instructions required by core $105_i$. Although not shown, it is understood that each core $105_i$ may include an L1 cache for storing data, and an L1 cache for storing instructions.

Each cache $115_i$ is partitioned into a number of cache lines, with each cache line corresponding to a range of adjacent locations in shared system memory 300. In one embodiment, each line of each cache, for example cache $115_1$, includes data to facilitate coherency between, e.g., cache $115_1$, main memory 155 and any other caches $115_2$, $115_3$, $115_4$, intended to remain coherent with cache $115_1$, as described further below. For example, in accordance with the MESI cache coherency protocol, each cache line is marked as being modified "M", exclusive "E", Shared "S", or Invalid "I", as is well known. Other cache coherency protocols, such as MSI, MOSI, and MOESI coherency protocols, are also supported by the embodiments of the present invention.

Each core $105_i$ is coupled to a coherence manager 140 via an associated bus $135_i$. Coherence manager 140 facilitates transfer of instructions and/or data between cores $105_i$, system memory 155, IO units 165 and optional shared L2 cache 150. Coherence manager 140 establishes the global ordering of requests, sends intervention requests, collects the responses to such requests, and sends the requested data back to the requesting core. Coherence manager 140 orders the requests so as to optimize memory accesses, load balance the requests, give priority to one or more cores over the other cores, and/or give priority to one or more types of requests over the others.

IO coherence unit (IOCU) 200 receives read and write requests from IO units 165 and processes them in a manner that is consistent with device ordering rules. When an IO request is received, for example, IOCU 200 determines if related requests are pending execution by coherence manager 140. If related IO requests are pending, IO coherence unit 200 orders the new requests in relation to the pending related requests. IO coherence unit 200 determines a next IO request and sends it to coherence manager 140 for processing. In addition, IOCU 200 receives responses to the pending IO requests from coherence manager 140 and determines an order for returning the responses to IO units 165.

Embodiments of IOCU 200 includes features for improving performance and efficiency in the context of a multiprocessor system. Among other aspects, IO coherence unit 200 is scalable in terms of the resources needed to manage pending IO requests. In one embodiment, IO coherence unit 200 includes a transaction table which can grow and shrink in response to the number of pending IO requests while observing strict ordering rules. In additional embodiments, IO coherence unit 200 manages variable-sized IO requests such that they delivered to coherence manager 140 for processing in parts and responses to these parts are tracked, collected, and returned to the requesting IO unit in accordance with device ordering rules. IO coherence unit 200 is designed for high performance and supports managing requests from multiple IO units in a parallel fashion while ensuring a fair allocation of resource among requesting devices.

Figure 2:
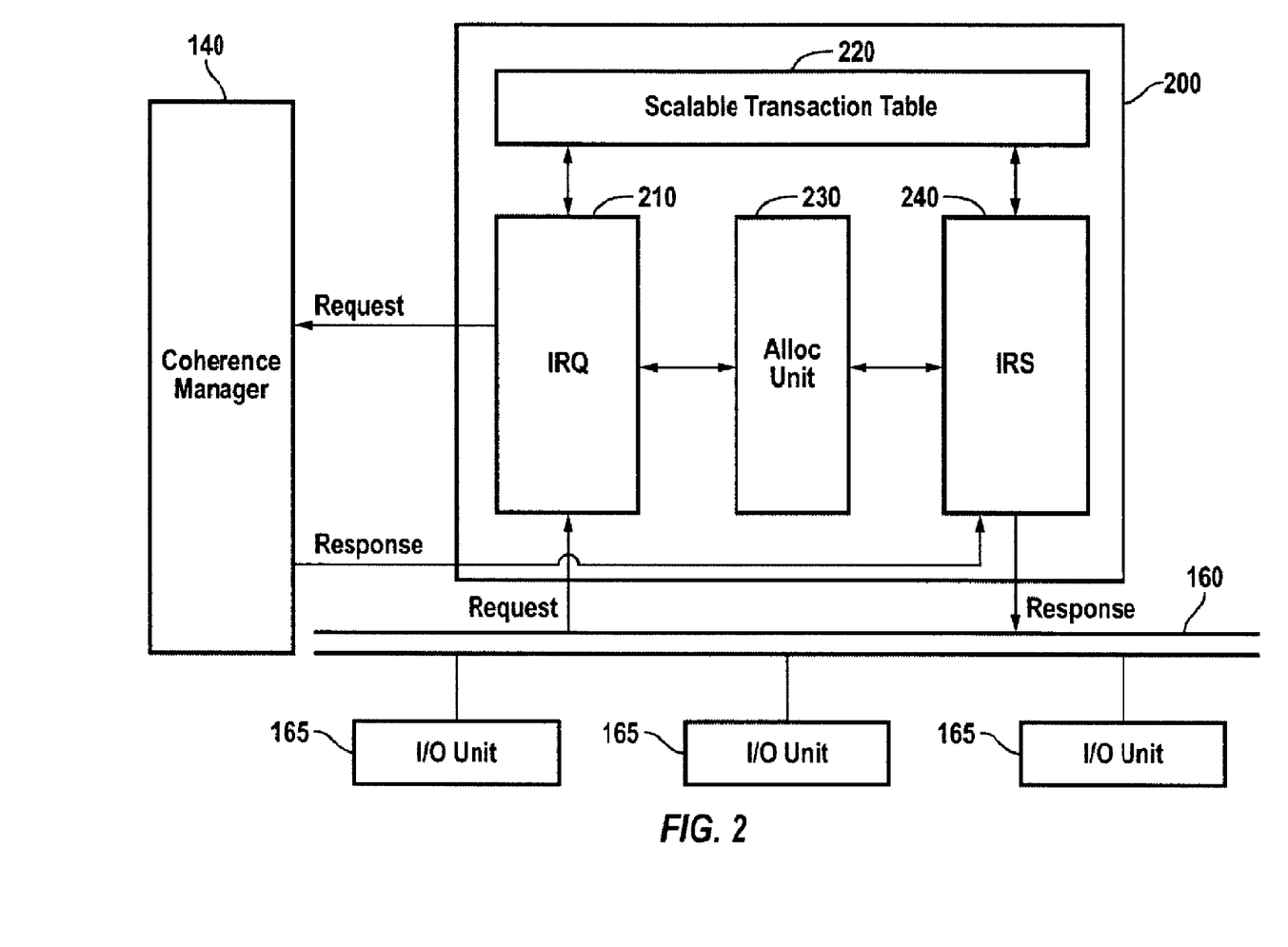
FIG. 2 is a high-level block diagram of an IO coherence unit according to embodiments of the present invention.

FIG. 2 is a high-level block diagram of an IO coherence unit 200 according to embodiments of the present invention. As shown, IOCU 200 includes IO request unit (IRQ) 210, scalable transaction table 220, allocation unit 230, and IO response unit (IRS) 240. IO coherence unit 200 receives requests from and returns responses to IO units 165 over bus 160. IO units 165 can include a multitude of peripheral devices which perform input/output operations with respect to the multi-processor system of which IOCU 200 is part. For example, IO units 165 can be storage devices or network adapters which generate large numbers of read and write requests. Read requests may specify a number of data units (such as double-words) to be returned, whereas write requests may provide write-data separately or together with the write request itself. IO coherence unit 200 receives the IO requests and returns responses to the appropriate requesting device.

IO coherence unit 200 includes hardware and logic circuits for communicating with various IO units 165 over bus 160. In an exemplary embodiment, signaling on bus 160 conforms to the OCP (open-core protocol) standard. IOCU 200 receives IO requests and generates responses using the message types and attributes supported by the bus protocol. Among other possibilities, these attributes may include a thread identifier (thread_id) for each request that is assigned by the requesting device. However, it will be understood that a number of bus protocols and message types can be used with IOCU 200 and that IOCU 200 is therefore not limited by the particular bus protocol that is selected.

IRQ 210 receives IO requests and is responsible for ordering the requests for processing by coherence manager 140. In some embodiments, IRQ 210 examines one or more attributes of each request to determine the type of the request and whether it is related to other pending requests. Thereafter, IRQ 210 requests an entry in transaction table 220 with which to store information about the newly received IO request from allocation unit 230. Allocation unit 230 determines if space is available in transaction table 220 and, if it is available, an address or other table identifier is returned to IRQ 210 for storing the information about the IO request. If an entry for the IO request cannot be allocated, IOCU 200 may stall processing of the request until space becomes available. In some cases, IOCU 200 may inform the requesting device that it is busy or, alternatively, it may simply allow the device to time-out on the request. A further discussion of request processing by IRQ 210 is now provided with reference to FIG. 2 and FIG. 3.

Figure 3A:
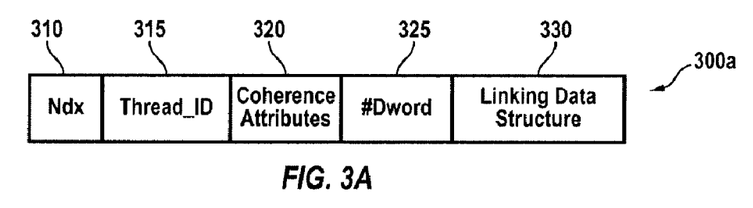
FIGS. 3A-3C show details of exemplary IO requests such as may be processed by the IO coherence unit depicted in FIG. 2.
Figure 3B:
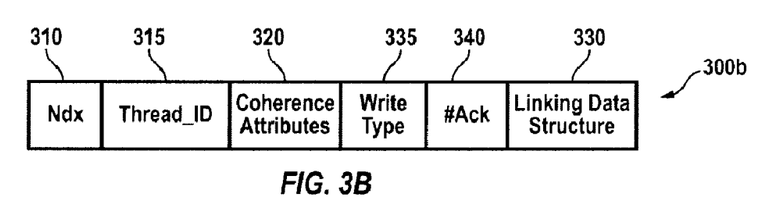

FIG. 3 shows exemplary information about pending IO requests such as might be stored in transaction table 220. FIG. 3A illustrates a read request entry 300a, whereas FIG. 3B depicts a write request entry 300b. As shown, entries for both read and write requests include indices 310 (Ndx) and thread identifiers 315 (Thread_ID). In some embodiments, indices 310 represent addresses or offsets into memory locations provided by transaction table 220. For example, allocation manager 230 may return an Ndx value to IRQ 210 in response to an allocation request whereupon IRQ 210 stores information about the pending request at the designated location. Thread identifiers 315, on the other hand, can be assigned by requesting devices and can be used to represent an ordering of IO requests. In a typical scenario, an IO unit may generate multiple IO requests and expect responses to be returned either in the order that the requests were issued for requests having the same thread identifier, or as quickly as possible for pending requests with different thread identifiers.

Coherence attributes 320 include information for maintaining data or instruction coherence in a multi-processor environment. For example, a request to load program instructions from an IO unit into the coherent memory space of a multi-processor system may require coherence manager 140 to perform various housekeeping operations. These operations, in turn, can affect the timing of responses vis-à-vis non-coherent IO requests with the same thread identifier. Thus, in some embodiments, IO coherence unit 200 stores coherence attributes with the pending IO request to facilitate the proper ordering of coherent and non-coherent responses.

Read request entry 300a is also shown as including a number of data units 325 expected as a result of the pending IO operation. The number of data units (#Dword) 325 may represent a number of double-word values or other data units that are required to complete the IO request. In some embodiments, this value is initially set by IRQ 210 based upon the received request and is thereafter updated by IRS 240 as responses to the pending request are received. Similarly, write request entry 300b includes a number of acknowledgements (#Ack) 340 expected as a result of the IO request. As with the number of data units 325, the number of acknowledgements 340 value may be set based upon the IO request and updated as responses from coherence manager 140 are received. In addition, write request entry 300b includes a write type 335 attribute. Write type 335 may include information about whether the write request is a posted or non-posted request. In some embodiments, devices may issue posted write requests, for example, when an explicit acknowledgement of completion is not required.

Figure 3C:
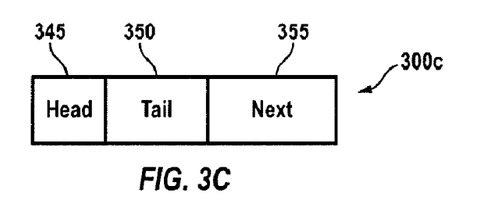

Linking data structure 330 is also included with both read request entry 300a and write request entry 300b and provides a means for ordering incoming IO requests for compliance with device requirements. FIG. 3C shows details of an exemplary linking data structure 330 in accordance with embodiments of the present invention. The exemplary data structure functions as a linked list in which entries having the same Thread_ID are arranged relative to each other. Each linking data structure 330 includes head 345, tail 350, and next 355 elements. The head 345 element indicates whether or not the particular entry is the first item in its respective linked list. Head 345 may be a binary value or, in some embodiments, it may include a pointer to the head of its list. Tail 350 indicates whether or not the entry is the last item in its respective thread list and may similarly include binary or pointer values. Next 355 is a pointer to the next item in the linked list of requests having the same Thread_ID. Next 355, for example, may contain the Ndx 310 value of the subsequent list item or it may be null to signify that the current entry is the last item in the linked list. Although discussed as a linked list, it will be recognized that a wide variety of linking data structures may be used with IO coherence unit 200.

In one embodiment, when an IO request is received, IRQ 210 determines whether any other IO requests having the same Thread_ID are pending at IOCU 200. Pending requests may be either read requests or write requests. If a pending request with the same thread identifier is detected, IRQ 210 adds an appropriate linking data structure to the entry allocated in transaction table 220 for the new IO request. In the case of a linked list structure, IRQ 210 updates the linked list so that the Next 355 element of the tail entry points to the Ndx 310 of the newly added entry and removes its status as tail by clearing the Tail 350 attribute. IRQ 210 also sets the Tail 350 and Next 355 elements of the new entry to reflect that it is now the last entry in the linked list. In this way, the newly added IO request is associated with existing entries in the transaction table and an order is established among pending IO requests having the same Thread_ID.

In some embodiments, IRQ 210 determines a next IO request and directs it to coherence manager 140 for processing. In the case of a read request, IRQ 210 may reserve buffers to hold data units returned by coherence manager 140 before the request is sent out for processing. If the next IO request is a write request, IRQ 210 ensures that the data to be written is available and can be sent out when needed. If either read buffers or write data are not available, IRQ 210 may stall processing of the IO request until they become available. In addition, IRQ 210 may stall a non-coherent write request if a coherent write with the same identifier is pending.

IRQ 210 can be configured to prioritize requests according to their attributes or according to the IO unit from which they were received. Alternatively, IRQ 210 can select the next IO so that requests sent out for processing are allocated fairly among requesting devices. For example, among other possibilities, fairness can be determined according to the total number of requests or in a round-robin fashion. In an exemplary embodiment, IRQ 210 processes requests with different thread identifiers in a parallel manner and processes requests with the same thread identifier in the order in which they are received.

IO response unit 240 monitors IO traffic from coherence manager 140 and updates entries in transaction table 220 as responses are received. In one embodiment, when a response is received, IRS 240 matches the response to an entry in transaction table 220 and makes a determination about whether data or acknowledgements can be returned to the requesting device. For example, the response may include the Ndx 310 of its corresponding entry in transaction table 220. IRS 240 uses the Ndx value to locate information about the pending IO request. If the response is to a pending read request, IRS 240 adjusts the number of data units 325 of the corresponding table entry. In one embodiment, #Dwords 325 is decremented for each data unit received. When data units for a particular entry have been received, IRS 240 determines whether they can be released to the requesting device. In one embodiment, IRS 240 releases data units to a requesting device when the IO request reaches the head of its respective linked list. This maintains compliance with per-thread device ordering requirements while improving the efficiency of IO transactions.

IRS 240 handles responses to write requests in a similar fashion. When a response to a write request is received, IRS 240 locates information about the pending IO request in transaction table 220. An Ndx 310 value can be included with the response for this purpose. Thereafter, IRS 240 adjusts the #Ack value of the IO request based upon the number of write acknowledgements returned. In some embodiments, all pending write requests are treated as non-posted writes while being processed by IO coherence unit 200. Thus, in such embodiments, notwithstanding that no acknowledgement to the requesting device is made, IOCU 200 may send a posted write request to coherence manager 140 as if it was a non-posted request and internally track acknowledgements to the posted write request to ensure that it has been completed. In some embodiments, IRS 240 acknowledges non-posted write requests to the requesting device when all acknowledgements for the request have been received and the request has reached the head of its respective linked list.

When a pending IO request is completed, IRS 240 de-links and de-allocates its entry in transaction table 220. In some embodiments, IRS 240 updates the linking data structure 330 of related IO requests to reflect that the pending IO request has been completed. With a linked list data structure, this can include de-linking the head of the list by designating the Next 355 element of the completed request as the new head of its corresponding linked list. In this way, the completed IO request is removed and the next IO request takes its place as the head of the list. IRS 240 then notifies allocation unit 230 that the entry corresponding to the completed IO request can be deallocated. For example, IRS 240 may communicate the Ndx of the completed IO request to allocation unit 230 causing its resources to be returned for use by new IO requests.

Accordingly, the size of transaction table 220 varies according to the number of pending IO requests. IOCU 200 can thus efficiently manage pending IO requests up to a maximum number of requests defined for the system based upon actual IO activity. Advantageously, transaction table 220 scales linearly and each additional entry can support one new IO request regardless of its thread identifier. In other words, it is not necessary to reserve parts of transaction table 220 for use by IO requests having a specific identifier. The size of transaction table 220 is therefore independent of the number of unique identifiers in use by the system at any given time. As a further enhancement, IOCU 200 can process pending IO requests with different identifiers in parallel fashion for increased performance while strictly complying with device ordering requirements as to requests with the same identifier.

Figure 4:
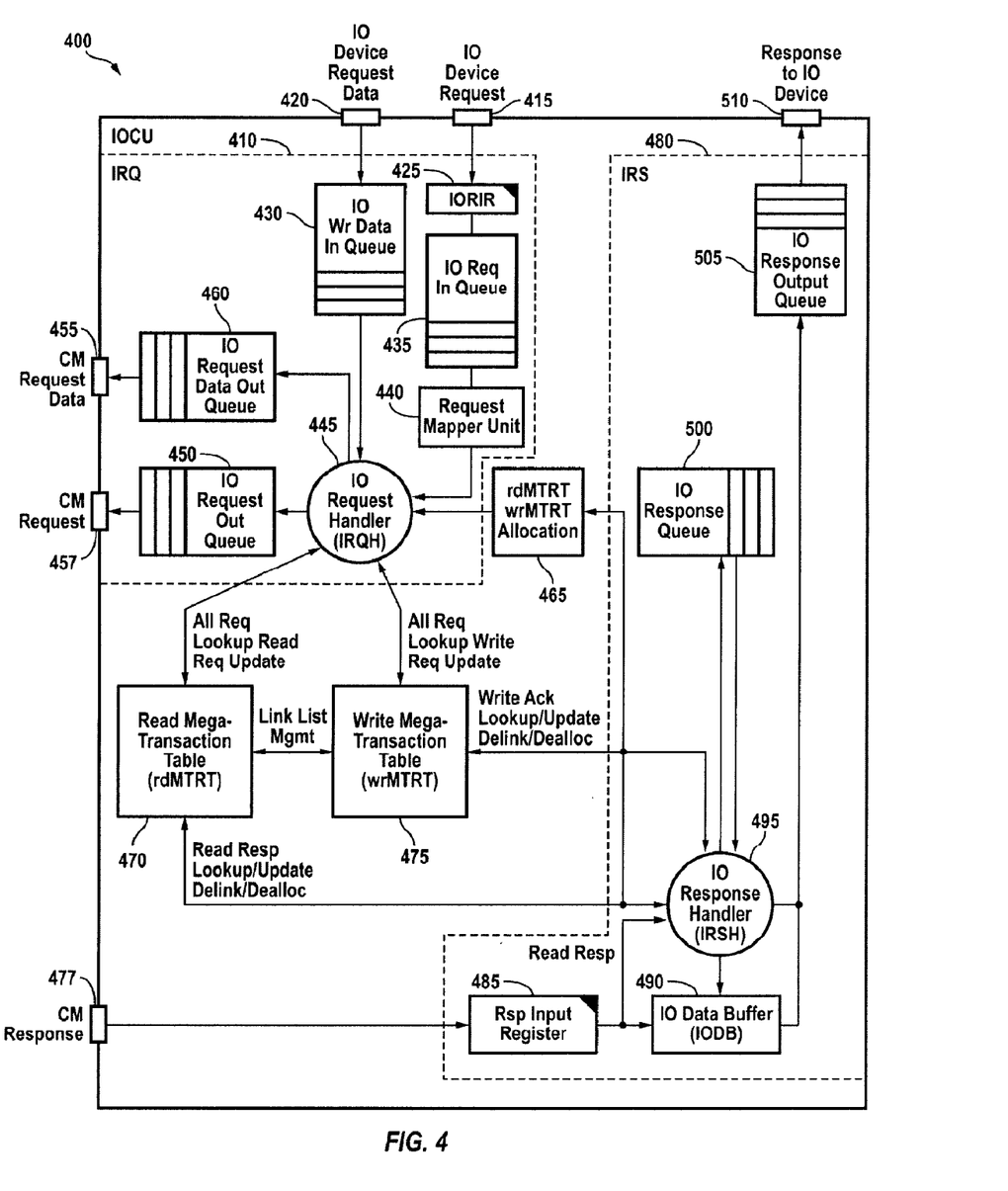
FIG. 4 is a block diagram of an IO coherence unit according to one embodiment of the present invention.

FIG. 4 is a block diagram of an IO coherence unit 400 according to another embodiment of the present invention. As shown, IOCU 400 includes a plurality of request and response ports for interfacing with IO devices and a coherence manager. Device request port 415 receives a serialized stream of IO requests from connected IO devices. IO requests received at port 415 can specify a command type and a target address along with attributes for controlling how the request is to be processed in a multi-processor environment. These additional attributes, for example, may indicate if the command is a coherent command and may specify an appropriate caching policy for the command. Device IO requests are initially placed into IO request input register (IORIR) 425 and then are stored in request input queue 435 pending further processing. Data accompanying a write request is received at data port 420 and stored in write data queue 430. Data in write data queue 430 can be associated with a pending write request using one or more identifiers.

Request mapper unit 440 examines the attributes of IO requests in the request input queue 435 and delivers the attributes together with a pending IO request to IO request handler (IRQH) 445 for processing. Request mapper unit 440 can include configurable logic elements which detect whether a pending IO request is a coherent or non-coherent request. In some embodiments, IRQH 445 may delay requests that are detected as non-coherent if a coherent request with the same identifier is pending at IOCU 400 in order to ensure a proper ordering of responses.

IRQH 445 is the nerve center of IRQ 410 and is responsible for request intake and processing. It receives inbound IO requests and their attributes along the input path and device data along the data path as previously indicated. In one embodiment, IRQH 445 adds the pending requests to the Request Output Queue 450 in the order they are received. Data accompanying write requests is added to Data Out Queue 460. When a request reaches the head of request output queue 450, it is delivered for processing at output port 457. IRQH ensures that write data is available in data out queue 460 when a write request is ready for processing in request output queue 450. Write requests and write data exit IOCU 400 through output port 457 and output port 455 respectively.

Before a pending IO request is sent out for processing, IRQH 445 stores information about the request in one of two-transaction tables. As shown, IOCU 400 includes a read mega-transaction table (rdMTRT) 470 and a write mega-transaction table (wrMTRT) 475. Based upon the type of the request, IRQH 445 requests a new entry in one of the mega-transaction tables. Allocation manager 465 determines whether an entry is available and, if it is, allocation manager 465 returns an index to the appropriate table for use by IRQH 445. If an entry cannot be allocated, allocation manager 465 notifies IRQH 445 that the requested table is full. Thereafter, IRQH 445 may stall processing of new read or write requests until allocation manager 460 indicates that new entries in the appropriate mega-transaction table can be allocated. In some embodiments, the combined size of rdMTRT 470 and wrMTRT 475 is established according to a maximum number of IO requests supported by the multi-processor system in which IOCU 400 is disposed.

In one embodiment, IRQH 445 is configured to process multi-cacheline read requests as a number of single-cacheline requests. Incoming read requests are examined to determine the number of data units requested. The requested data units may be mapped to a number of cachelines as defined by the system architecture. For example, if a single cacheline consists of four double-word (DWORD) values, then a read request which specifies four or fewer DWORD values would be a single-cacheline request. Similarly, if the read request specifies more than four DWORD values as, for example, with a burst request, it would be treated as a multi-cacheline request. IRQH 445 divides multi-cacheline read requests into a plurality of single-cacheline and stores information about each single-cacheline request in rdMTRT 470 as discussed below.

Before adding an entry to either of the mega-transaction tables 470, 475, IRQH 445 determines if any related IO requests are pending at IOCU 400. This is done so that responses to related requests can be returned in conformance with device ordering requirements and also to facilitate out-of-order responses for unrelated requests as a performance enhancement. In one embodiment, IRQH 445 determines that requests are related based upon a thread identifier (Thread_ID) as previously discussed. However, tags or other attributes can be used to enforce relationships or to define additional/secondary relationships among requests in accordance with the present invention.

If mega-transaction tables 470, 475 do not contain related requests, IRQH 445 stores information about the new IO request in the location provided by allocation manager 465. Information about the request can include its identifier, the number of responses expected, and a linked list structure used to determine its relationship to other pending IO requests. In an exemplary embodiment, rdMTRT 470 includes entries as shown in FIG. 3A whereas wrMTRT 475 includes entries as shown in FIG. 3B. In some embodiments, posted write requests are treated as unrelated to other IO requests and are therefore not linked to existing entries in the mega-transaction tables.

When IRQH 445 determines that one or both of the mega-transaction tables contain related IO requests, it associates the new IO request with the existing requests. This can be done, for example, by adding the new IO request to the tail of the linked list corresponding to its thread identifier. It will be appreciated that IRQH 445 has the capability of searching both rdMTRT 470 and wrMTRT 475 for related IO requests and that, in the case of a linked list data structure, the tail entry can be updated in either transaction table. Thus, for example, IRQH 445 may update an entry in wrMTRT 475 to reflect that a new read request with the same thread identifier has been received by setting the Next element of the write request to point to a newly added entry in rdMTRT 470. In this way, IRQH 445 establishes and maintains an order among related IO requests.

In the case of multi-cacheline read requests, the plurality of constituent single cacheline requests are linked together and are also linked to any related transactions already present in rdMTRT 470. IRQH 445 may add all of the single cacheline requests to rdMTRT 470 together or it may alternate adding the single cacheline requests and other unrelated read requests. In either case, IRQH 445 maintains order among related IO requests as required by device ordering rules.

Responses to pending IO requests are received through CM port 477 and directed to IO Response Unit (IRS) 480. New responses are stored temporarily in Response Input Register (RIR) 485. As illustrated, data returned in response to a read request is stored separately in IO Data Buffer (IODB) 490.

Upon receipt of the response and/or data, IO Response Handler (IRSH) 495 is notified and begins its processing activities.

The response in RIR 485 can include an identifier by which it is associated with its pending IO request in one of the mega-transaction tables 470, 475. In one embodiment, IRQH 445 includes the index value supplied by allocation manager 465 with each IO request that is sent out for processing. The same index value is returned with the IO response permitting a match to the corresponding entry in rdMTRT 470 or wrMTRT 475. IRSH 495 uses this identifier to locate the pending IO request for which the response is received.

After locating the entry in the appropriate mega-transaction table, IRSH 495 updates its information based upon the response received. For example, IRSH 495 adjusts the number of expected data units (e.g., #Dword 325) of a pending read request to reflect the number of data units received and stored in IO Data Buffer 490. Similarly, IRSH 495 adjusts the number of expected acknowledgements (e.g., #Ack 340) of a pending write request based upon the number of acknowledgements indicated by the response. When all acknowledgments or data units have IO been received for a pending IO request, that request is deemed to be completed. In some embodiments, IRSH 495 releases received data units to a requesting device when an IO read request reaches the head of its respective list. In this case, the IO read request is deemed complete when IRSH 495 processes the last data unit associated with the particular request.

When a pending IO request is completed, IRSH 495 performs a number of tasks and eventually sends a response to the requesting IO device. IRSH 495 monitors the completed IO request and detects when it has reached the head of its respective linked list. At this point, the completed IO request can be disassociated from pending IO requests and its entry de-allocated in the appropriate mega-transaction table. In the case of a linked list, a completed IO request is detected as the head of its respective list with reference to the appropriate element of its data structure (e.g., Head 345) and is de-linked by designating the next list item (e.g., Next 355) as the new head of the list. After a completed IO request is disassociated from pending IO requests, IRSH 495 notifies allocation manager 465 and allocation manager 465 reclaims the entry for use by other IO requests.

Completed IO requests are stored in IO Response Queue 500 to be returned to their respective requesting devices. As space becomes available in IO Response Output Queue 505, IRSH 495 moves completed responses from response queue 500 to output queue 505. If the request is a read request, IRSH 495 also transfers its corresponding data from IODB 490 to output queue 505. Responses and data in output queue 505 are returned to the requesting devices via response port 510.

Figure 5:
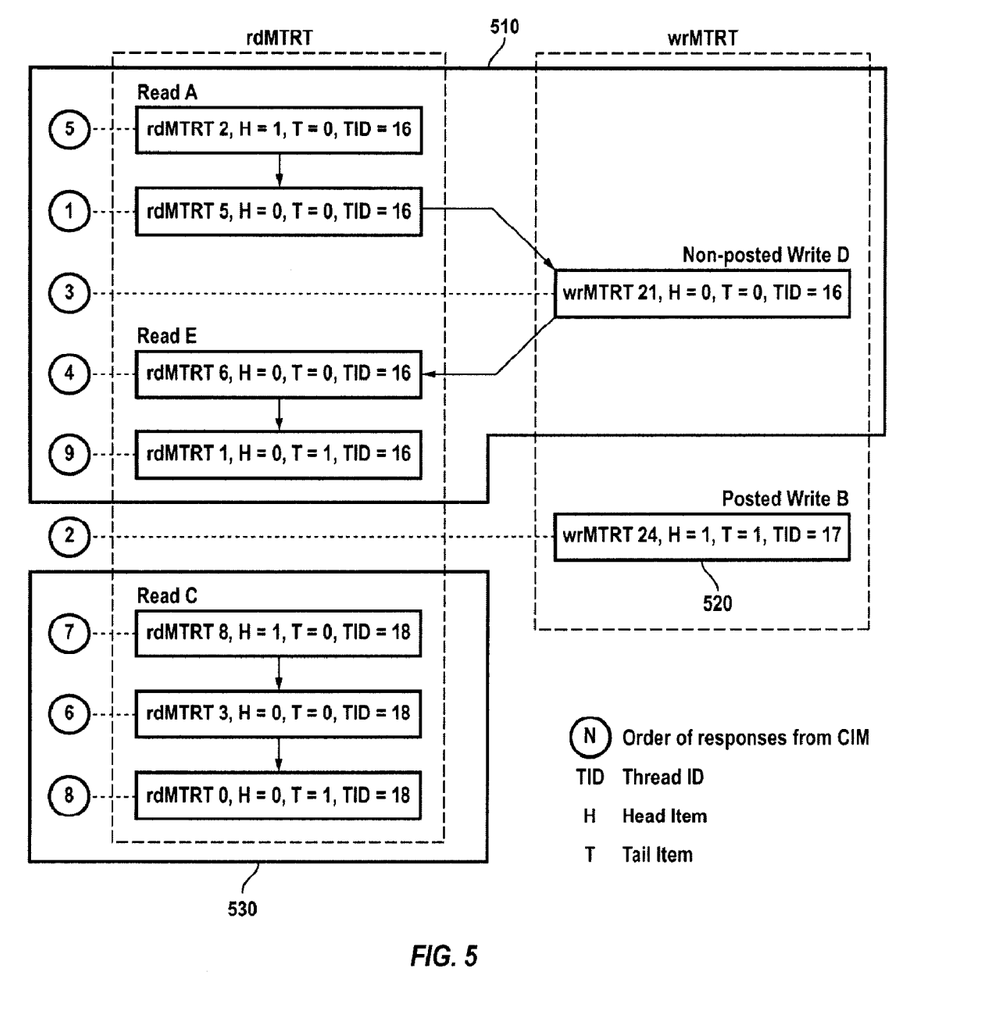
FIG. 5 illustrates a processing sequence for IO requests according to one embodiment of the present invention.

FIG. 5 illustrates a processing sequence for IO requests according to one embodiment of the present invention. Related requests are shown as having the same thread identifier (TID) and form a linked list. The order of IO requests in each linked list is illustrated with arrows. Thus, the first group 510 includes one linked list of five related transactions which include two read requests (Read A, Read E) and one non-posted write request (Write D). The third group 530 includes another linked list of three related requests (Read C). Single request 520 is a posted write (Write B) which is not related to other pending requests.

Sequence identifiers ①-⑧ indicate the order in which complete responses to the pending requests are received. As shown, Read A includes two entries in the read transaction mega-table. The first entry (rdMTRT 2) is positioned at the head of its respective linked list (H=1) and points to the second part (rdMTRT 5). The first and second parts, for example, may represent the single cacheline requests generated in response to a multi-cacheline burst. Non-Posted Write D (wrMTRT 21) and Read E (rdMTRT 6) follow Read A at intermediate positions (H=0, T=0) in the linked list for thread identifier 16. The second part of Read E (rdMTRT 1) forms the tail (T=1) of the list.

To follow device ordering requirements among related requests, a response to Read A will be returned before a response to Write D, and the response to Write D will be returned before the response to Read E. This is true, for example, notwithstanding that Write D is acknowledged at sequence number ③ or that a response to the first part of Read E (rdMTRT 6) is received at sequence ④ whereas the response to Read A (rdMTRT 2) does not arrive until sequence number ⑤. Group 530 provides an example of enforcing IO ordering among the constituent parts of multi-cacheline request. As shown, a response to rdMTRT 3 will not be returned until after response to rdMTRT 8 is made. This is true despite the fact that a response to rdMTRT 3 is received at sequence number ⑥ whereas a response to rdMTRT 8 is not received until sequence number ⑦.

Figure 6:
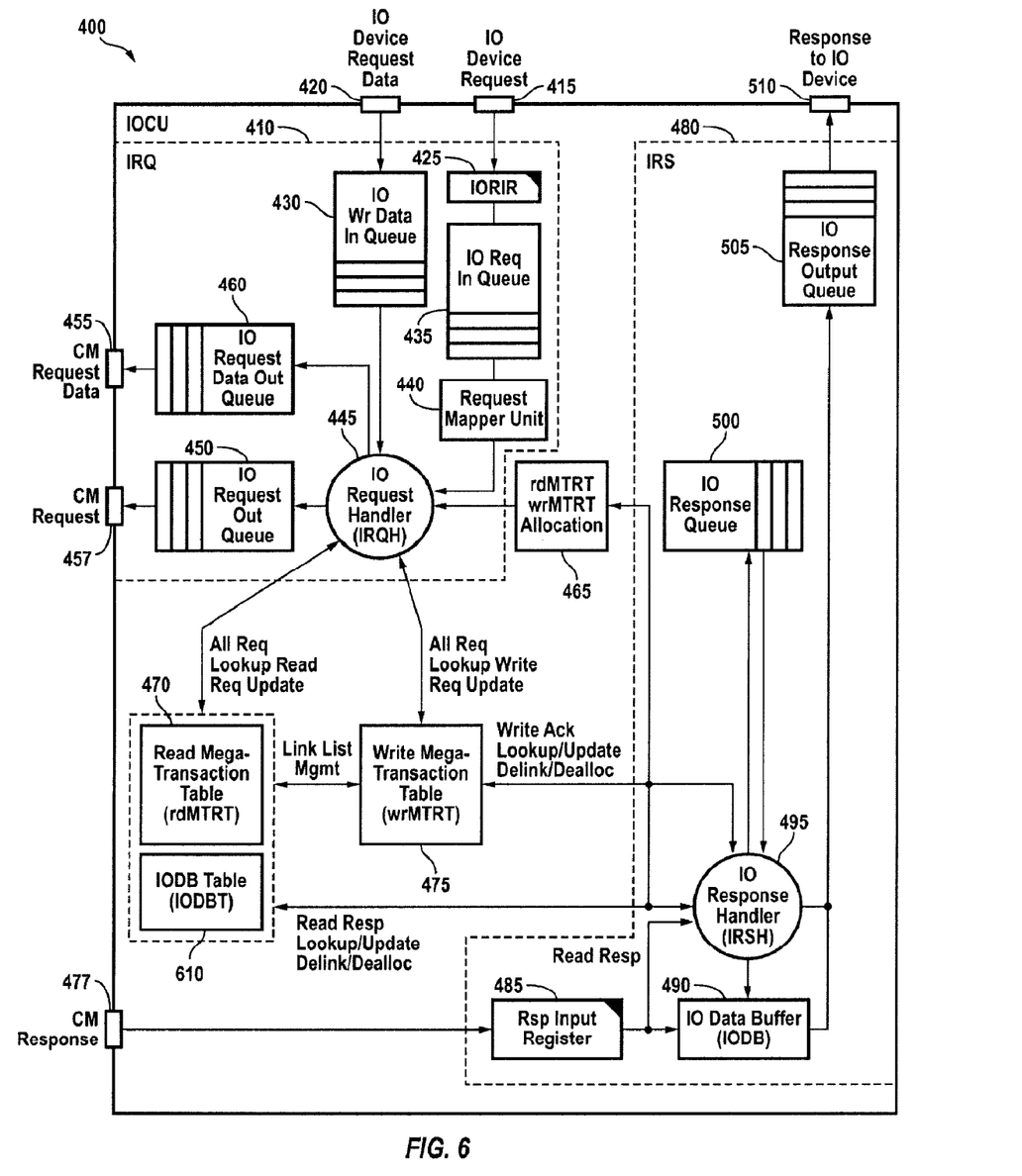
FIG. 6 is a block diagram of an IO coherence unit according to another embodiment of the present invention.

FIG. 6 is a block diagram of an IO coherence unit (IOCU) 600 according to a further embodiment of the present invention. IOCU 600 is similar to IOCU 400 except in the handling of read requests. Accordingly, a discussion of parts unrelated to these changes is omitted in the interest of clarity.

In the presently described embodiment, read requests are tracked both in rdMTRT 470 and IODBT 610. When a read request is received, IRQH 445 requests allocation of entries in both tables from allocation manager 465. A single entry is allocated in rdMTRT 470 and one or more related entries are allocated in IODBT 610. IRQH 445 stores information about a read request, including its thread identifier and linking data structure, in rdMTRT 470 to establish a global ordering of related requests. As disclosed herein, the global ordering spans both read and write mega-transaction tables by virtue of its linking data structure. IRQH 445 also stores information relating to the read request in one or more entries of IODBT 610. Entries in IODBT 610 are associated with their corresponding entry in rdMTRT 470 and can include information about the number of responses required for their completion. In addition, entries in IODBT 610 have a linking structure for ordering response on a per-read-request basis.

For example, assume that a five-cacheline read request is received. IRQH 445 divides the multi-cacheline request into its five single-cacheline constituents and requests allocation of one entry in rdMTRT 470 and five entries in IODBT 610 from allocation manager 465. The entry in rdMTRT 470 is associated with related IO requests pending at IOCU 600 whether they are stored in rdMTRT 470 or wrMTRT 475 using its linking data structure. Each of the five entries in IODBT 610 points to the newly allocated entry in rdMTRT 470 and each specifies a number of responses required for its completion. In addition, the five related IODBT entries are linked together so that requested data is returned according to device ordering rules. In general, for each multi-cacheline read request, one entry is allocated in rdMTRT 470 and N related entries are allocated in IODBT 610, where N represents the number of single-cacheline requests corresponding to the multi-cacheline request.

As responses are received, IRSH 495 updates the entries in IODBT 610 and adjusts the number of responses which remain outstanding. When all responses have been received, IRSH 495 determines if the completed IODBT entry is at the head of its respective linked list. If it is, IRSH 495 further determines whether its corresponding entry in rdMTRT 470 is at the head of its respective linked list. When both conditions are satisfied, IRSH 495 releases responses to the completed IODBT entry, disassociates it from other pending requests, and removes its entry from IODBT 610. After all entries in IODBT 610 corresponding to an entry in rdMTRT 470 have been deallocated, IRSH 495 de-links and deallocates the rdMTRT entry and returns its resources for further use by IOCU 600.

IOCU 600 thus includes separate tables for storing the details of read requests. As a result, the read and write mega-transaction tables can be sized according to a maximum number of IO requests supported by the system. Separate control can thus be exercised over the size of multi-cacheline requests or the number of such requests that are allowed at any given time. For example, IRQH 445 can be configured so that if sufficient entries for a multi-cacheline request cannot be allocated in IODBT 610, that request can be stalled or rejected whereas one or more single-cacheline requests can still be accepted for processing. Decoupling entries in rdMTRT 470 and IODBT 610 also enables IOCU 600 to dynamically control the ratio of multi-cacheline read requests to multi-cacheline write requests and to make more efficient use of system resources. Many variations are possible and within the scope of the present invention.

Figure 7:
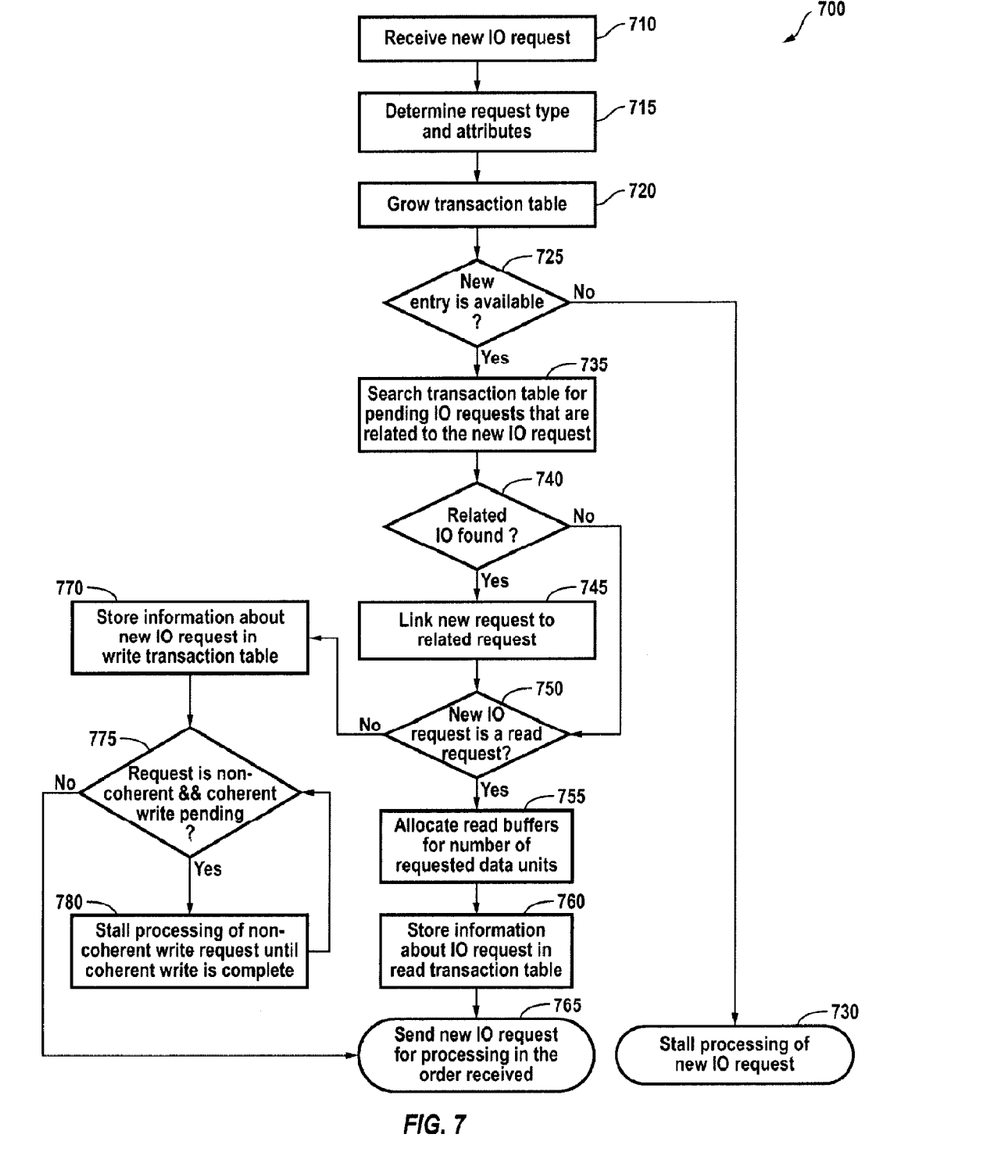
FIG. 7 is a flowchart of IO request processing according to one embodiment of the present invention.

FIG. 7 is a flowchart of IO request processing 700 according to one embodiment of the present invention. In various embodiments, IO request processing 700 is performed by IRQH 445. At step 710, a new IO request is received. The new IO request is examined at step 715 to determine the type of the request and its processing attributes. Next, at step 720, an attempt is made to grow the transaction table to accommodate the new request. In some embodiments, more than one transaction table is provided in which case the request type and attributes are used to select the appropriate transaction table for resizing.

At step 725, a determination is made as to whether an entry is available to store information about the new IO request. If an entry is not available, at step 730 processing of the new IO request is stalled. This may occur, for example, if a maximum number of IO requests has been reached. In some embodiments, resources are dynamically reallocated if the grow operation fails. By way of illustration, load balancing operations can redistribute resources among transaction tables depending upon prevailing conditions. Thus, if a high volume of read requests are received, resources allocated for use by a write transaction table can be reassigned to the read transaction table and vice versa. Alternatively, the system can dynamically assign additional resources to any of the transaction tables if an entry for the new transaction is not available.

If an entry can be allocated for the new IO request, at step 735, a search for related IO requests is performed on all transaction tables. For example, a determination of whether IO requests are related may be based upon one or more of the request attributes. Each transaction table may be searched for these attributes and, at step 740, a decision can be made based upon the results of the search. If related IO requests are found then, at step 745, the new IO request is linked to the related IO requests to maintain the ordering of responses expected by a requesting device.

Different processing is performed depending upon whether the IO request is a read or a write request. Processing of write requests proceeds from step 750 to step 770. At step 770, information about the request is stored in the write transaction table. In addition, in connection with the search for related transactions, an additional coherence determination is made at step 775. If the new request is a non-coherent request and a related coherent write request is pending response then, at step 780, processing of the non-coherent request is stalled until the related coherent write is completed. This can compensate for different operations that may be involved in handling multi-core or multi-processor IO requests and the potentially different timing of such requests. Otherwise, at step 765, the new write request is sent out for processing.

Processing of read requests proceeds from step 750 to step 755. At step 755, buffers are allocated to hold read data units which are returned in response to the request. Information about the read request is stored in the read transaction table at step 760. At step 765, the request is sent out for processing. This completes processing of single-cacheline requests. In the case of multi-cacheline requests, processing may continue according to the branch taken at step 750. For example, steps 755-765 may be repeated once for each single-cacheline constituent of a multi-cacheline read request such that entries are allocated and requests are sent until the entire IO request has been processed. In some embodiments, multi-cacheline write requests are treated as a plurality of single-cacheline requests but with only one entry being allocated in the write transaction table. Thus, in the case of a multi-cacheline write request, step 765 may be repeated for each of its single-cacheline parts, whereas step 770 is performed only once in processing the request.

Figure 8:
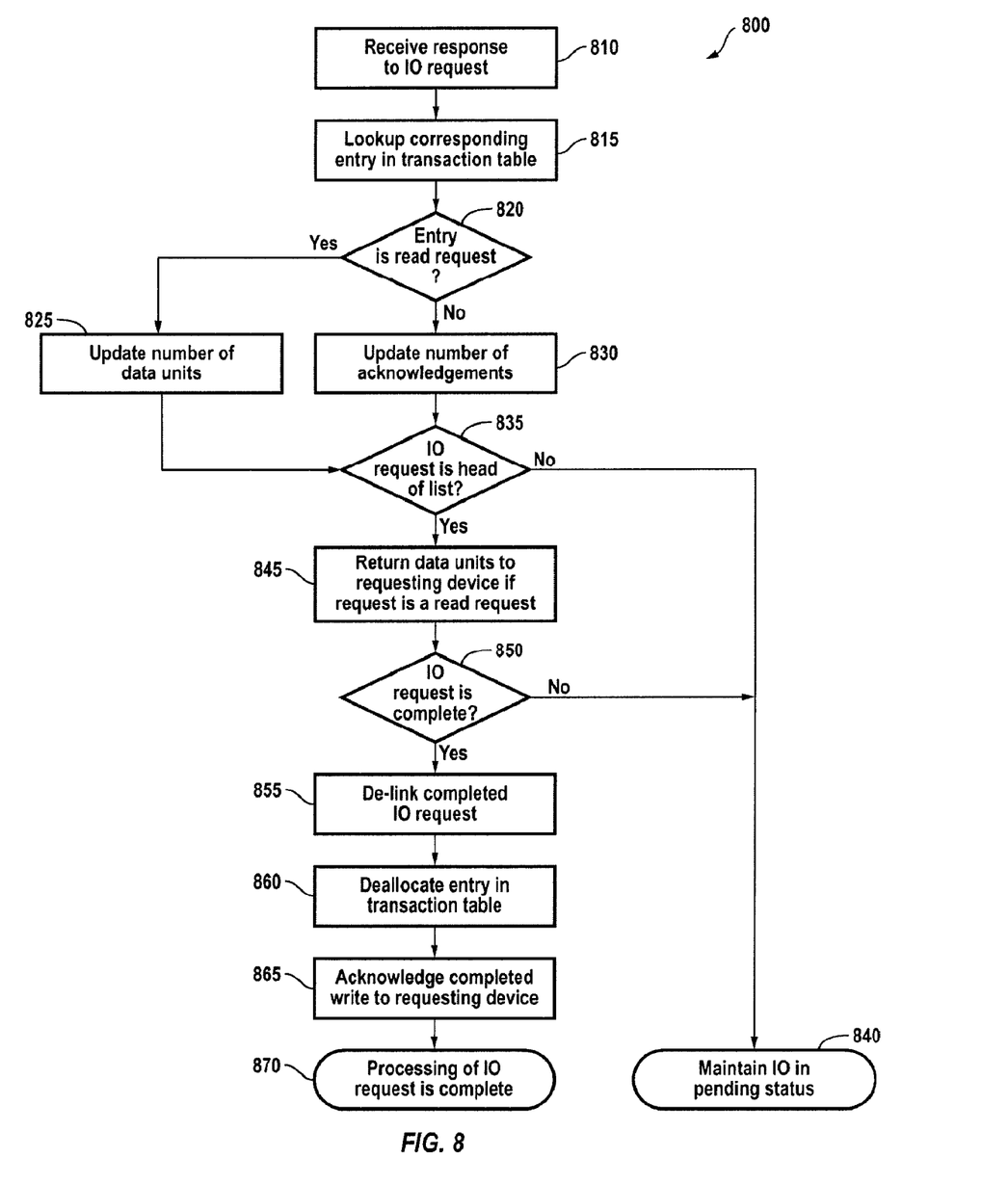
FIG. 8 is a flowchart of IO response processing according to embodiments of the present invention.

FIG. 8 is a flowchart of IO response processing 800 according to one embodiment of the present invention. In various embodiments, IO response processing 800 is performed by IRSH 495. At step 810, a response is received. To process the response, a lookup is performed at step 815 and, at step 820, information about the pending IO request is retrieved. This information is updated according to the type of request. A number of expected data units, for example, is updated at step 825 if the request is a read request. Otherwise, if the request is a write request, the number of acknowledgements is updated at step 830 based upon the response.

Next, at step 835, a determination is made as to whether the pending IO request is the head of its respective list of related requests. If the IO request is not the head of its list, this can indicate that related IO requests which preceded the IO request are still being processed. In this case, at step 840, the IO request is maintained in pending status. Otherwise, processing continues to step 845. At step 845, data units received in response to a read request that has reached the head of its list are returned to the requesting device.

At step 850, the system determines if further data units or acknowledgements are required to complete the IO request. For example, if the information in the transaction table indicates that no further responses are expected for a pending IO request, the request is deemed complete. If the pending IO request is not completed, it is maintained in pending status, step 840, and response traffic is monitored for additional acknowledgements or data units.

At step 855, the completed IO request at the head of its list is removed and disassociated from the related IO requests. As part of the de-linking, list maintenance operations are performed and the next list item becomes the new head of the list. At step 860, the entry for the completed IO request is deallocated and made available to store information about another IO request. In this way, the transaction table is dynamically sized according to the number of pending IO requests. Also, available resources can be claimed by any IO request, whether or not it is related to other pending requests. If the IO request is a write request, at step 865, an acknowledgement that all data units have been written is returned to the requesting device. Processing of the IO request is complete at step 870.

Figure 9:
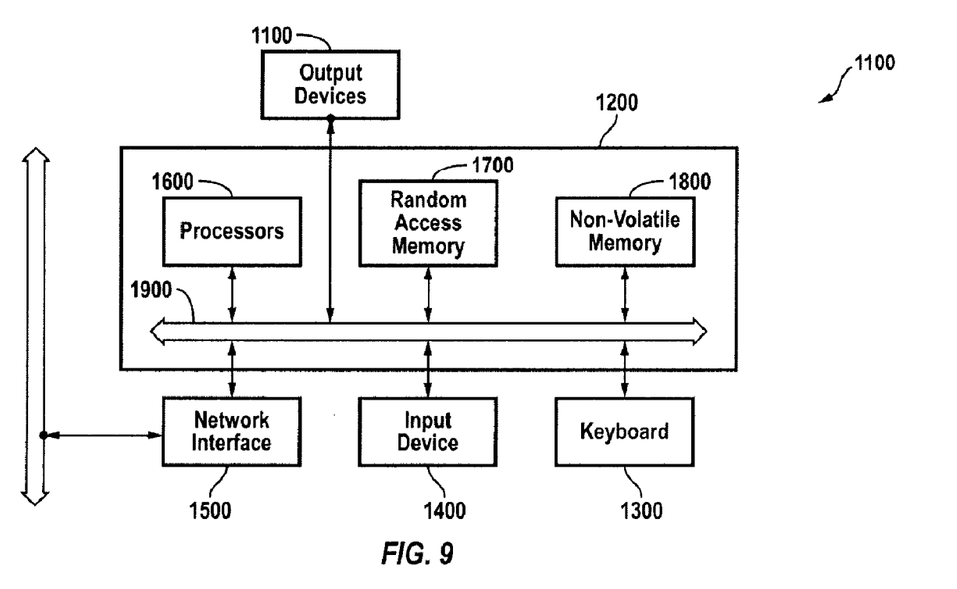
FIG. 9 shows an exemplary computer system in which the present invention may be embodied.

FIG. 9 illustrates an exemplary computer system 1000 in which the present invention may be embodied. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 may include a computer mouse, a trackball, joystick, track pad, graphics tablet, touch screen, microphone, various sensors, and/or other wired or wireless input devices that allow a user or the environment to interact with computer system 1000. Network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 may be a multi-processor system such as multi-processor 100 described above.

RAM 1700 and non-volatile memory 1800 are examples of tangible media for storage of data, audio/video files, computer programs, applet interpreters or compilers, virtual machines, and embodiments of the present invention described above. For example, the above-described embodiments of the processors of the present invention may be represented as human-readable or computer-usable programs and data files that enable the design, description, modeling, simulation, testing, integration, and/or fabrication of integrated circuits and/or computer systems. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the present invention may use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication.

Further embodiments of computer 1200 can include specialized input, output, and communications subsystems for configuring, operating, simulating, testing, and communicating with specialized hardware and software used in the design, testing, and fabrication of integrated circuits.

Although some exemplary embodiments of the present invention are made with reference to a processor having four cores, it is understood that the processor may have more or fewer than four cores. The arrangement and the number of the various devices shown in the block diagrams are for clarity and ease of understanding. It is understood that combinations of blocks, additions of new blocks, re-arrangement of blocks, and the like fall within alternative embodiments of the present invention. For example, any number of IO units, coherent multi-core processors, system memories, L2 and L3 caches, and non-coherent cached or cacheless processing cores may also be used.

It is understood that the apparatus and methods described herein may be included in a semiconductor intellectual property core, such as a microprocessor core (e.g., expressed as a hardware description language description or a synthesized netlist) and transformed to hardware in the production of integrated circuits. Additionally, the embodiments of the present invention may be implemented using combinations of hardware and software, including micro-code suitable for execution within a processor.

The above embodiments of the present invention are illustrative and not limitative. Various alternatives and equivalents are possible. The invention is not limited by the type of integrated circuit in which the present disclosure may be disposed. Nor is the invention limited to any specific type of process technology, e.g., CMOS, Bipolar, BICMOS, or otherwise, that may be used to manufacture the various embodiments of the present invention. Other additions, subtractions or modifications are obvious in view of the present invention and are intended to fall within the scope of the appended claims.

What is claimed is:

1. An input/output (IO) coherence unit for use in a multiprocessor system, the IO coherence unit comprising:
    an IO request handler configured to receive pending IO requests from a plurality of IO devices and to determine a next IO request for processing by the multiprocessor system;
    a transaction table configured to store information about the pending IO requests such that the size of the transaction table varies according to the number of the pending IO requests,
    wherein the IO request handler allocates entries in the transaction table and stores information about pending IO requests to establish an order among pending IO requests having a same identifier; and
    an IO response handler configured to receive a response to a pending IO request and to update an entry in the transaction table corresponding to the response, the IO response handler configured to determine an order of responses in accordance with the information in the transaction table,
    wherein the IO coherence unit returns the responses to the plurality of IO devices in the order determined by the IO response handler.

2. The input/output coherence unit of claim 1 wherein the IO request handler converts a pending IO request that is a multi-cacheline read request into a plurality of single cacheline read requests and allocates entries in the transaction table for each of the single cacheline read requests.

3. The input/output coherence unit of claim 2 wherein the IO request handler allocates buffers to store read data units corresponding to each single cacheline read request for which an entry is allocated in the transaction table.

4. The input/output coherence unit of claim 1 wherein the IO request handler converts a pending IO request that is a multi-cacheline write request into a plurality of single cacheline write requests and allocates a single entry in the transaction table for the multi-cacheline write request.

5. The input/output coherence unit of claim 1 wherein the IO request handler processes pending IO requests having different identifiers in a parallel fashion and processes IO requests having the same identifier in the order they are received.

6. The input/output coherence unit of claim 1 wherein the transaction table comprises a first transaction table and a second transaction table, and wherein the IO request handler determines a request type for each pending IO request and stores read requests in the first transaction table and write requests in the second transaction table.

7. The input/output coherence unit of claim 6 wherein each pending IO request includes a thread identifier, and wherein the IO request handler searches the first and second transaction tables for the thread identifier of a received IO request and associates the received IO request with IO requests in the first and second transaction tables using the thread identifier.

8. The input/output coherence unit of claim 7 wherein the first and second transaction tables comprise linked lists of pending IO requests and the IO request handler associates the received IO request with the pending IO requests by adding it to the tail of a linked list corresponding to its thread identifier.

9. The input/output coherence unit of claim 7 wherein IO response handler detects that a pending IO request is completed when a predetermined number of responses corresponding to the pending IO request are received.

10. The input/output coherence unit of claim 9 wherein the IO response handler returns a response to an IO device for a completed IO write request when the completed IO request becomes the head of its respective linked list.

11. The input/output coherence unit of claim 8 wherein the IO response handler returns data units corresponding to an IO read request to an IO device in the plurality of IO devices when the IO read request becomes the head of its respective linked list.

12. The input/output coherence unit of claim 9 wherein the IO response handler updates the linked list of pending IO requests when a completed 10 request becomes the head of the linked list and removes the entry for the completed 10 request from the first or second transaction table.

13. The input/output coherence unit of claim 1 wherein the pending IO requests include read requests and write requests, and wherein each pending write request comprises a number of acknowledgements and each pending read request comprises a number of data units.

14. The input/output coherence unit of claim 13 wherein the IO response handler updates the number of acknowledgments for a pending write request and the number of data units for a pending read request each time a response is received for the pending write request and the pending read request respectively.

15. The input/output coherence unit of claim 6, further comprising:
    an allocation manager configured to allocate an entry for a received IO request in the first transaction table if the received request is a read request and to allocate an entry in the second transaction table if the received request is a write request,
wherein the IO request handler stalls processing of the received IO request if the allocation manager is unable to allocate an entry for the received request in its respective transaction table.

16. The input/output coherence unit of claim 1, further comprising:
a first input port coupled to the IO request handler for receiving a serialized stream of read and write requests from the plurality of IO devices;
a second input port for receiving data corresponding to write requests received at the first IO port,
wherein, if the next IO request is a write request, the IO request handler determines if write data corresponding to the next IO request is received at the second port and suspends the next IO request if it is determined that the write data is not received.

17. A method of maintaining coherence among input/output (JO) requests in a multiprocessor system, the method comprising:
receiving pending IO requests from a plurality of IO devices;
allocating entries in a transaction table for the pending IO requests such that a size of the transaction table varies according to the number of the pending IO requests;
storing information about the pending IO requests in the transaction table, including information for establishing an order among pending IO requests having a same identifier;
determining a next IO request for processing by the multiprocessor system from among the pending IO requests;
receiving a response to a pending IO request;
updating an entry in the transaction table corresponding to the response;
determining an order for returning responses to the plurality of IO devices in accordance with information stored in the transaction table; and
returning responses to the plurality of IO devices in the order determined from the transaction table.

18. The method of claim 17 wherein the transaction table includes a first transaction table and a second transaction table, the method further comprising:
detecting a request type for a pending IO request;
allocating an entry in the first transaction table if the pending IO request is detected as being a read request;
allocating an entry in the second transaction table if the pending IO request is detected as being a write request; and
storing information about the pending IO request in the entry allocated for that IO request.

19. The method of claim 17, further comprising:
converting a pending IO request that is a multi-cacheline read request into a plurality of single cacheline read requests;
allocating entries in the transaction table for each of the single cacheline read requests; and
storing information about the single cacheline read requests in the entries that are allocated.

20. The method of claim 19, further comprising allocating buffers to store read data units corresponding to each single cacheline read request for which an entry is allocated in the transaction table.

21. The method of claim 17, further comprising:
processing pending IO requests having different identifiers in a parallel fashion; and
processing pending IO requests having the same identifier in the order they are received.

22. The method of claim 18 wherein each pending IO request includes a thread identifier, the method further comprising:
searching the first and second transaction tables for the thread identifier of a received IO request; and
associating the received IO request with pending IO requests using the thread identifier.

23. The method of claim 22 wherein the first and second transaction tables comprise linked lists of pending IO requests, and wherein associating the received IO request with the pending IO requests comprises adding the received IO request to the tail of a linked list corresponding to its thread identifier.

24. The method of claim 22, further comprising:
detecting that a pending IO request is completed when a predetermined number of responses corresponding to the pending IO request are received.

25. The method of claim 24, further comprising:
returning a response to an IO device for a completed IO request when the completed IO request becomes the head of its respective linked list.

26. The method of claim 24, further comprising:
updating the linked list of pending IO requests when a completed IO request becomes the head of the linked list; and
removing the entry for the completed IO request from the first transaction table.

27. The method of claim 17 wherein the pending IO requests include read requests and write requests, and wherein each pending write request comprises a number of acknowledgements and each pending read request comprises a number of data units.

28. The method of claim 27, further comprising:
updating the number of acknowledgments for a pending read write request and updating the number of read units for a pending read request each time a response is received for the pending write request and the pending read request respectively.

29. The method of claim 17, further comprising:
stalling receipt of IO requests if an entry in the transaction table cannot be allocated for a pending IO request.

30. The method of claim 17, further comprising:
receiving write data corresponding to each pending IO request that is a write request; and
stalling processing of the next IO request if its corresponding write data is not received.

31. An input/output (JO) coherence unit for use in a multiprocessor system, the IO coherence unit comprising:
an IO request handler configured to receive pending IO requests from a plurality of IO devices and to determine a next IO request for processing by the multiprocessor system;
variable-size first and second transaction tables configured to store information about the pending IO requests, including one or more linked list data structures, such that the combined size of the transaction tables varies according to the number of the pending IO requests,
wherein the IO request handler detects a type of each pending IO request and allocates an entry in the first transaction table for a pending IO request that is detected as being a read request or the second transaction table for a pending IO request that is detected as being a write request; and an IO response handler configured to receive a response to a pending IO request and to update the linked list data structure corresponding to the response, the IO response handler further configured to determine an order of responses in accordance with the information in the first and second transaction tables.

* * * * *